United States Patent [19]
Li et al.

[11] Patent Number: 5,619,059
[45] Date of Patent: Apr. 8, 1997

[54] COLOR DEFORMABLE MIRROR DEVICE HAVING OPTICAL THIN FILM INTERFERENCE COLOR COATINGS

[75] Inventors: Li Li, Gloucester; Jerzy A. Dobrowolski, Ottawa; Peter D. Grant, Metcalfe; Brian T. Sullivan, Gloucester, all of Canada

[73] Assignee: National Research Council of Canada, Ottawa, Canada

[21] Appl. No.: 314,003

[22] Filed: Sep. 28, 1994

[51] Int. Cl.⁶ ............................. H01L 27/14; H01L 31/00
[52] U.S. Cl. ............................................ 257/431; 257/432
[58] Field of Search .................................. 257/431, 432, 257/433, 436

[56]  References Cited

U.S. PATENT DOCUMENTS 5,022,745  6/1991  Zayhowski et al. .
5,168,406  12/1992  Nelson .
5,240,818  8/1993  Mignardi et al. .
5,452,138  9/1995  Mignardi et al. .

Primary Examiner—Mahshid D. Saadat
Assistant Examiner—S. V. Clark
Attorney, Agent, or Firm—Neil Teitelbaum & Associates

[57] ABSTRACT

A semiconductor device comprises a plurality of colored deformable mirrors controllable by electrical circuitry. Groups of mirrors, responsive to the electronic signals, are selectably operable to reflect incident light. The deformable mirrors are coated with an optical thin film interference color coating having at least a layer that is substantially transparent to the visible light. As well the optical thin film interference color coating includes at least one further layer that is partially absorbing with respect to the visible light. The spectral reflectance and absorptance of the deformable mirror is modified in order to obtain a desired reflected color by the process of optical interference enhanced absorption in the optical thin film interference color coating. The optical thin film interference color coating has predetermined layer thicknesses and materials; the substantially transparent layer substantially determines the desired reflected color.

18 Claims, 8 Drawing Sheets

COLOR DEFORMABLE MIRROR DEVICE HAVING OPTICAL THIN FILM INTERFERENCE COLOR COATINGS

FIELD OF THE INVENTION

This invention is related to the field of electronic devices and more particularly to deformable mirror devices.

BACKGROUND OF THE INVENTION

A deformable mirror device (DMD) includes a plurality of electronically controllable mirrors. Each mirror is capable of a mechanical movement in response to an electrical signal and can reflect incident light in one of two predetermined directions corresponding to the mirror's orientation. DMDs can be used as light modulators for optical signal processing as well as for displaying images electronically. For example, a DMD having an array of tightly spaced small mirrors or pixels in the form of rows and columns can be used in a projection display. The two orientations in which each mirror or pixel reflects light are defined as the "on" and "off" state of the mirror or pixel. Therefore this particular type of DMD may be referred to hereafter as a digital micro-mirror device. Because of its high pixel density, such a DMD is capable of producing images comparable in resolution to cathode ray tube (CRT) displays, liquid crystal displays, etc. Advantageously, the process for manufacturing a DMD display is compatible with that used in the semiconductor industry. Furthermore, the mirrors can be switched "on" or "off" in micro-seconds; hence, it is capable of displaying rapidly changing images. Another advantage is that the light reflected from an "off" pixel travels along a different path and is not projected onto the image screen; hence, the display has a high contrast. Since approximately 90% of the incident light falling onto the individual "on" pixels is reflected towards the image screen, this results in a more energy efficient display compared to liquid crystal projection displays.

Currently, the individual mirrors in a conventional DMD are made of an aluminum substrate that reflects light uniformly throughout the visible spectrum; therefore, the conventional DMD is monochromatic. There are several approaches to make a colour projection display system using a DMD. Two approaches involve colour filtering the light either before or after it is reflected from the DMD. In the first approach, known also as "sequential" colour, a single monochromatic DMD is used. White light first passes through a rotating colour filter wheel having red (R), green (G) and blue (B) filters. The filtered white light then falls onto a monochromatic DMD and the light reflected from the "on" pixels forms an image on a projection screen. The light reflected from the "off" pixels travels along a different path and is absorbed by a light absorber. While this sequential colour projection display system displays only one colour at a time, an observer actually perceives a colour based on the three time-integrated primary colours. This approach has certain disadvantages: a) only one colour is displayed at any given time, that reduces the brightness of the display; b) synchronization between the rotating colour filter wheel and the DMD driver is required; and c) the use of a rotating colour filter wheel makes it difficult to reduce the overall size of the display system.

In the second approach, three monochromatic DMDs are used, one for each of the three primary colours: R, G and B. Either three colour light sources or a single white light source, divided into three primary colour beams by dichroic beam-splitters, can be used in the system. The three colour images from the three monochromatic DMDs are combined into a single image to produce the desired colour picture. The disadvantages of this system include complex chip alignment, output convergence, excessive cost and large package size of the required optical system.

A different approach for a full colour projection display system is to use a colour DMD as disclosed by W. E. Nelson in U. S. Pat. No. 5,168,406, issued on Dec. 1, 1992. The disclosed colour DMD has a colour filter on top of each aluminum mirror. Advantageously, no extra light splitting and combining optical components are required in the display. In Nelson's patent, the colour filters are implemented using intrinsic absorption in dye materials. In the manufacturing of this dye colour DMD, a dye filter mosaic or dye coating is first deposited onto a glass substrate. Next, the dye filter is subsequently transferred to a DMD chip by a sublimation process. In this process, the dye filter mosaic or coating is placed next to a DMD chip and is heated by a printing head. The dye material is vaporized and condenses on the surface of the DMD. Alternatively, dye filters may be deposited by electrically charging the individual mirrors of a DMD. A dye cloud is then introduced next to the DMD and condenses on the surface of the individual charged mirrors. Another method for manufacturing a colour filter for deformable mirror device has been disclosed by M. A. Mignardi et al. in U.S. Pat. No. 5,240,818, issued on Aug. 31, 1993. In their approach, a solution of a dye-resist mixture is spun uniformly onto a nearly completed DMD chip. The dye-resist coating in the unwanted area is then removed by photo-lithography, i.e., by exposing the chip to UV light through a mask and developing it. Different dye-resist materials can be applied in the same way to form, for example, a red, green and blue multi-colour filter array. A transparent layer is then deposited to protect the dye-resist filters.

There are several disadvantages to all the above dye or dye-resist mixture filter approaches: The stability of the dye-resist or dye filters is poor and these dye or dye-resist filters normally degrades with time. As well, their performance tends to deteriorate when exposed to heat and light sources that are present in projection display systems. Also, dye-resist and dye colours filters deposited by spinning or sublimation often have poor adhesion to the mirror substrate. In addition, the quality of the dye filters can be poor, which could result in light scattering reducing the contrast of the display. Furthermore, the processes to apply these dyes or dye-resist mixtures might not be fully compatible with current manufacturing process of the DMDs.

OBJECT OF THE INVENTION

It is an objective of the present invention to provide a more stable colour deformable mirror device having optical thin film interference colour coatings.

Another object of the present invention is to provide a method of depositing optical thin film interference colour coatings onto a deformable mirror device.

SUMMARY OF THE INVENTION

In accordance with the present invention there is provided, a semiconductor device comprising: circuitry for accepting electronic signals; a plurality of deformable mirrors selectably operable to reflect incident light, responsive to the electronic signals; and, a first group of said plurality of deformable mirrors being coated with an optical thin film interference colour coating having at least a layer that is substantially transparent with respect to the incident light, the optical thin film interference colour coating including at least one further layer that is partially absorbing with respect to the incident light, so that the spectral reflectance and absorptance of the deformable mirror is modified to produce a desired reflected colour by the process of optical interference enhanced absorption in the optical interference colour coating, the layers being of predetermined thicknesses and materials, wherein the thickness of the substantially transparent layer substantially determines the desired reflected colour.

The optical thin film interference colour coating in accordance with the present invention may comprise an optional high reflectance layer, at least one transparent layer on top of the high reflectance layer and at least one partially absorbing layer on top of the transparent layer. The colour deformable mirror device may comprise a second group of said colour mirrors that reflect a second group of wavelengths of the incident visible light to obtain a second reflected colour and may further comprise a third group of said colour mirrors that reflect a third group of wavelengths of the incident visible light to obtain a third reflected colour. The colour deformable mirror device has a first, second and third group of said colour mirrors forming three-colour pixels. Alternatively, the colour deformable mirror device may comprise a first, second and third groups of said colour mirrors and a group of neutral mirrors forming four-colour pixels.

In accordance with yet another aspect of the present invention, there is further provided, a method for the manufacture of a colour deformable mirror device having a semiconductor substrate, driving electronics on the semiconductor substrate, and a plurality of deformable mirrors for reflecting incident light, the method comprising the steps of: applying an optical thin film interference colour coating upon a first group of the deformable mirrors by physical vapor deposition or chemical vapor deposition processes; the optical thin film interference colour coating being of predetermined thicknesses and materials and being suitable for reflecting a first group of wavelengths of the visible light to obtain a first colour, said coating including at least a substantially transparent layer and at least a partially absorbing layer.

One advantage of the present invention is that materials typically used in the optical thin film interference colour coatings are either substantially transparent or partially absorbing uniformly throughout the visible spectrum and optical interference enhanced absorption is used to engineer which particular wavelengths of light are absorbed or reflected by the optical thin film interference colour coating in order to obtain a desired reflected colour. Thus, the invention provides a high degree of flexibility; for example, different colours can be achieved by using the same materials but with different layer thicknesses. Furthermore, the colour performance of the optical thin film interference colour coatings can be designed to match most colour standards currently in use in the world such as those of the National Television System Committee (NTSC), the Phase Alternation Line (PAL) and the Sequentiel Couleur avec Mémoire (SECAM). In contrast, dyes, as disclosed in the prior art, are engineered to absorb at specific wavelengths of light and these wavelengths cannot be changed without changing the dyes themselves. Hence, the use of dyes is less flexible compared to the present invention.

Another advantage of the present invention is that the optical thin film interference colour coatings are made of dielectric materials and metals that are very stable both chemically and physically. Their performance can withstand harsh environments and will not deteriorate with time or with high temperatures.

Another advantage of the present invention is that the process to deposit optical thin film interference colour coatings is compatible with the process currently used to produce monochromatic deformable mirror devices. It can be easily integrated with the current process with little additional equipment.

Another advantage of the present invention is that the optical thin film interference colour coating not only filters light but also acts as a protective coating for the aluminum mirrors; therefore, the colour deformable mirror device in the present invention is more stable than the conventional monochromatic aluminum deformable mirror devices and the dye type colour deformable mirror devices.

Another advantage of the present invention is the flexibility to select the available coatings materials for the purpose of compensating stress in the mirror and the optical thin film interference colour coating.

Another advantage of the present invention is that the optical thin film interference colour coatings can be designed so that the absorption of light outside the visible spectral region is minimized. As well the spectral distribution of the light source and the spectral response of the optical image system and the human eye can be taken into account in the design of the optical thin film interference colour coatings in order to optimize the performance of the colour display and to minimize the required number of optical components.

Yet another advantage of the present invention is that the optical thin film interference colour coatings can be designed to have a very high luminance reflectance for a given light source.

BRIEF DESCRIPTION OF THE DRAWINGS

Exemplary embodiments of the present invention will be described in conjunction with the drawings in which.

DETAILED DESCRIPTION

For a better understanding of the present invention, a background knowledge of a present-day deformable mirror device is desirable, and herein, the reader is referred to "Spatial Light Modulator and Method," U.S. Pat. No. 4,662, 746, L. J. Hornbeck, issued on May 5, 1987, and "Spatial Light Modulator and Method," U.S. Pat. No. 5,172,262, L. J. Hornbeck et at., issued on Dec. 15, 1992. The detailed description of the present invention is best illustrated with the aid of drawings FIGS. 1–7.

A colour deformable mirror device in accordance with the present invention comprises at least one deformable mirror that has an optical thin film interference colour coating. The optical thin film interference colour coating is based on optical interference enhanced light reflection and absorption as described in the follows:

Optical interference is defined as the variation of electromagnetic wave amplitude with distance or time, caused by the superposition of two or more waves of electromagnetic radiation (light). These two or more waves can be the result of reflection or transmission at the interfaces of layers in an optical thin film interference coating, used in the present invention, provided that the thicknesses of the individual layers are sufficient to support optical interference at the wavelengths of interest. Intrinsic absorption of light, used in dye colour filters as described in U.S. Pat. No. 5,168,406, is defined as the process whereby some of the energy of electromagnetic radiation (light) is transferred to a substance on which it is incident or which it traverses.

It is possible to significantly enhance the amount of absorbed light in an optical thin film interference coating to obtain a desired performance, for example, a particular reflected colour, through the phenomenon of optical interference, over that of intrinsic absorption alone, provided that as stated above the thickness of the individual layers are sufficient to support the optical interference at the wavelengths of interest. This phenomenon is hereinafter referred to as optical interference enhanced absorption.

Figure 1:
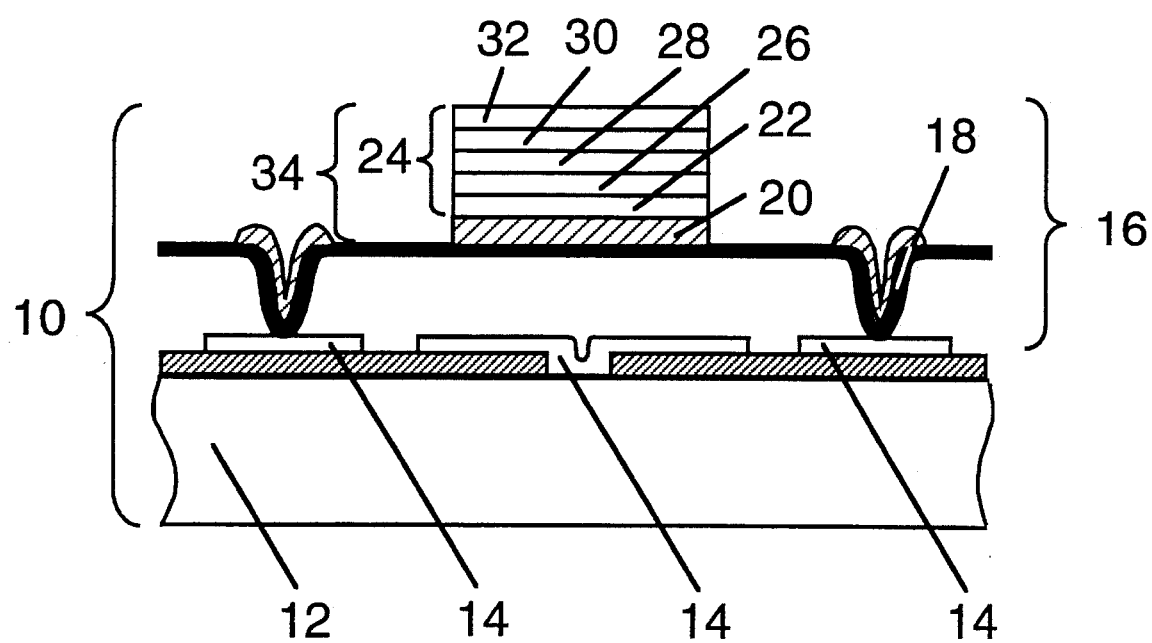
FIG. 1 shows a portion of a cross-sectional view of a colour deformable mirror device in accordance with the present invention.
Figure 2:
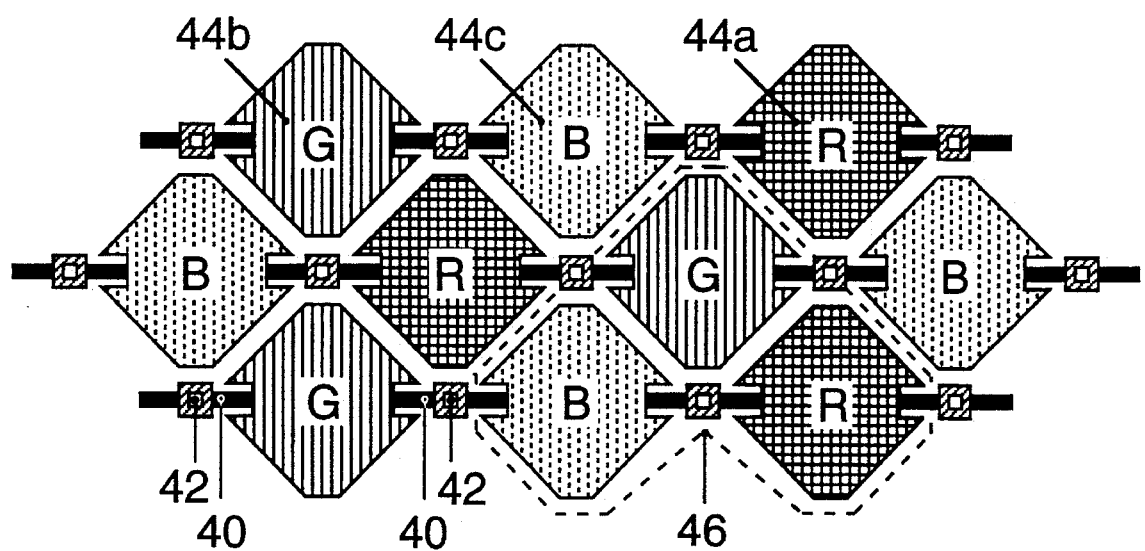
FIG. 2 shows a plan view of a colour deformable mirror device having three optical thin film interference colour coatings in accordance with the present invention.

FIG. 1 shows a cross-sectional view of a portion of a colour deformable mirror device 10, having a semiconductor substrate 12, a driving electronics 14 on top of the semiconductor substrate 12, and a mirror element 16 on top of the driving electronics. The mirror element 16 is comprised of the mirror supporting posts 18, the torsion hinges 20, the mirror substrate 22 and a optical thin film interference colour coating 24. The optical thin film interference colour coating 24 may include an optional high reflectance layer 26, a transparent layer 28, a partially absorbing layer 30, and, if necessary, other subsequent transparent and partially absorbing layer(s) 32. The optical thin film interference colour coating 24 and the mirror substrate together form a colour mirror 34. If the optional high reflectance layer 26 is omitted, the mirror substrate 22 will act as the coating substrate for the optical thin film interference colour coating 24 and will become part of the optical thin film interference colour coating 24. Different optical thin film interference colour coatings can be deposited on top of different mirror substrates in a pre-defined way to form different colour mirrors as shown in a plan view in FIG. 2. Each colour mirror is supported by two hinges 40 and two posts 42. Three individual red 44a, green 44b and blue 44c colour mirrors together form a pixel 46. Such a colour DMD can be used in a full colour projection display system with only one white light source.

Without departure from the spirit of the present invention, the mirror element 16 can have other configurations as well. For example, the colour mirror 34 can have a different shape and can be supported by a spacer layer in a cantilever structure as described in U.S. Pat. No. 5,172,262. More particularly, the colour mirror 24 can have only one supporting post centered in the middle, where the post sits on top of another mirror substrate supported by torsion hinges and posts, as described in "Multi-level Deformable Mirror Device," U.S. Pat. No. 5,083,857, by L. J. Hornbeck et al., issued on Jan. 28, 1992. This configuration eliminates the hinge and supporting area on the surface and results in a larger mirror aperture that is desirable in a projection display system.

Unlike the approaches disclosed in U.S. Pat. No. 5,168, 406 and 5,240,818 that rely only intrinsic absorption of light in dyes or dye-resist mixtures to form colour filters, the optical thin film interference colour coating 24 in the present invention is based on optical interference enhanced reflection and absorption of light incident upon the coating. Therefore, the optical thin film interference colour coating is much more flexible and can be designed to absorb and reflect certain wavelengths of light in the visible spectrum to obtain a desired reflected colour, as well as to reflect most of the light in the infrared region to reduce heat absorption. Dyes or dye-resist mixtures normally absorb most of the infrared radiation incident upon them. In addition, to achieve a desired colour, many different thin film multilayer designs can be obtained. More importantly, with the same materials, it is possible to achieve different reflected colours by varying only the thicknesses of the substantially transparent layers. This will simplify the manufacture process of the optical thin film interference colour coatings. The properties of a practical display system can be taken into account in the optical thin film interference colour coating design process to obtain an optimal performance, i.e., the spectral distribution of the light source and the spectral response of the optical system and of the human eye. As well, since the human eye is not sensitive to the red and blue parts of the visible spectral region, it is possible to design a red or a blue optical thin film interference colour coating with a relatively higher luminance reflectance.

The mirror substrate 22 can be made of a conducting metal, metal alloy or semiconductor, i.e., Al, Cr, Co, Cu, Au, Hf, Mo, Ni, Nb, Pt, Ag, Ta, Ti, W, Yr, Zr,, Si, Ge, nickel alloy such as Inconel™, etc. The optional high reflectance layer 26 can be made of a high reflectance metal or metal alloy, i.e., Al, Cr, Co, Cu, Au, Hf, Mo, Ni, Nb, Pt, Ag, Ta, Ti, W, Yr, Zr,, Si, Ge, nickel alloy such as Inconel™, etc. The mirror substrate 22 or the optional high reflectance layer 26 acts as the first optical layer for the subsequent layers in the optical thin film interference colour coating 24. If the mirror substrate 22 is also made of a high reflectance material, such as aluminum, then the layer 26 is not necessary. The transparent layer 28, and, if necessary, the subsequent transparent layer(s) 32 can made of transparent dielectric materials from the group of oxides, nitrides, fluorides, selenides and sulfides, such as, $SiO_2$, $Al_2O_3$, $HfO_2$, $Nb_2O_5$, $Ta_2O_5$, $TiO_2$, $Y_2O_3$, $ZrO_2$, SiN, AlN, $MgF_2$, $CaF_2$, ZnSe, ZnS, etc. The partially absorbing layer 20, and if necessary, the subsequent partially absorbing layer(s) 32, can be made of absorbing metals, metal alloys or semiconductors, i.e., Cr, Co, Cu, Au, Hf, Mo, Ni, Pt, Ag, Ta, Te, Ti, W, Yr, Zr, Inconel™, Si, Ge, etc.

$SiO_2$ is a preferred material for the transparent layer(s) in the optical thin film interference colour coatings in connection with the present invention; this is because it normally has low stress and is already used in a conventional DMD for other purposes. $Al_2O_3$ is another preferred material for the transparent layer(s) because it has a higher refractive index than $SiO_2$, a good thermal conductivity and low stress. Nickel or nickel alloys, e.g., Inconel™, are preferred absorbing materials for the partially absorbing layer(s) because they are very stable both chemically and physically. They also have good thermal conductivity. Aluminum is a preferred material for the mirror substrate 22 as well for the optional high reflectance layer 22; this is because Al has not only good electronic and thermal conductivity, but also a high reflectance. Other coating materials can be chosen as well, for example, materials with opposite stress can be used to balance the total stress in the mirror elements.

Several embodiments of the present invention will be described in detail in the following descriptions. Without departing from the spirit of the present invention and for the purpose of a more practical demonstration, the following conditions are assumed: First, the embodiments are designed for a Xenon-arc lamp source that is currently used in a projection display system employing a conventional monochromatic DMD. The spectral distribution of the Xenon-arc light source is taken from a curve in the book *"Color Science: concepts and methods, quantitative data and formulae"* by G. Wyszecki et al., 2nd ed., published by Wiley in Toronto in 1982. The optical image system in the projection display is assumed to have a uniform spectral performance in the visible spectral region. Third, the light is incident upon the "on" colour mirrors or pixels at an angle of 10° from the normal incidence, which is the normal operation angle in a DMD. Fourth, the first embodiment of the optical thin film interference colour coatings in accordance with the present invention is designed to match the CIE (Commission Internationale de L'Eclairage) coordinates of the current CRT red, green and blue phosphors. Fifth, the second embodiment of the optical thin film interference colour coatings in accordance with the present invention is designed to match the CIE coordinates of the National Television System Committee (NTSC) standards, that are taken from the book, *"Television Engineering Handbook,"* edited by K. B. Benson, published by McGraw-Hill, New York, in 1992. Other colour standards can be specified as well without departing from the spirit of the present invention.

A colour deformable mirror device in accordance with the present invention, comprises at least one colour mirror array having an optical thin film interference colour coating. In the case of a full colour DMD, three optical thin film interference colour coatings providing red, green and blue colours are required. In the following descriptions, all embodiments will include three groups of colour mirrors while each group having a different optical thin film interference primary colour coating on top of the individual mirror substrates.

Figure 3:
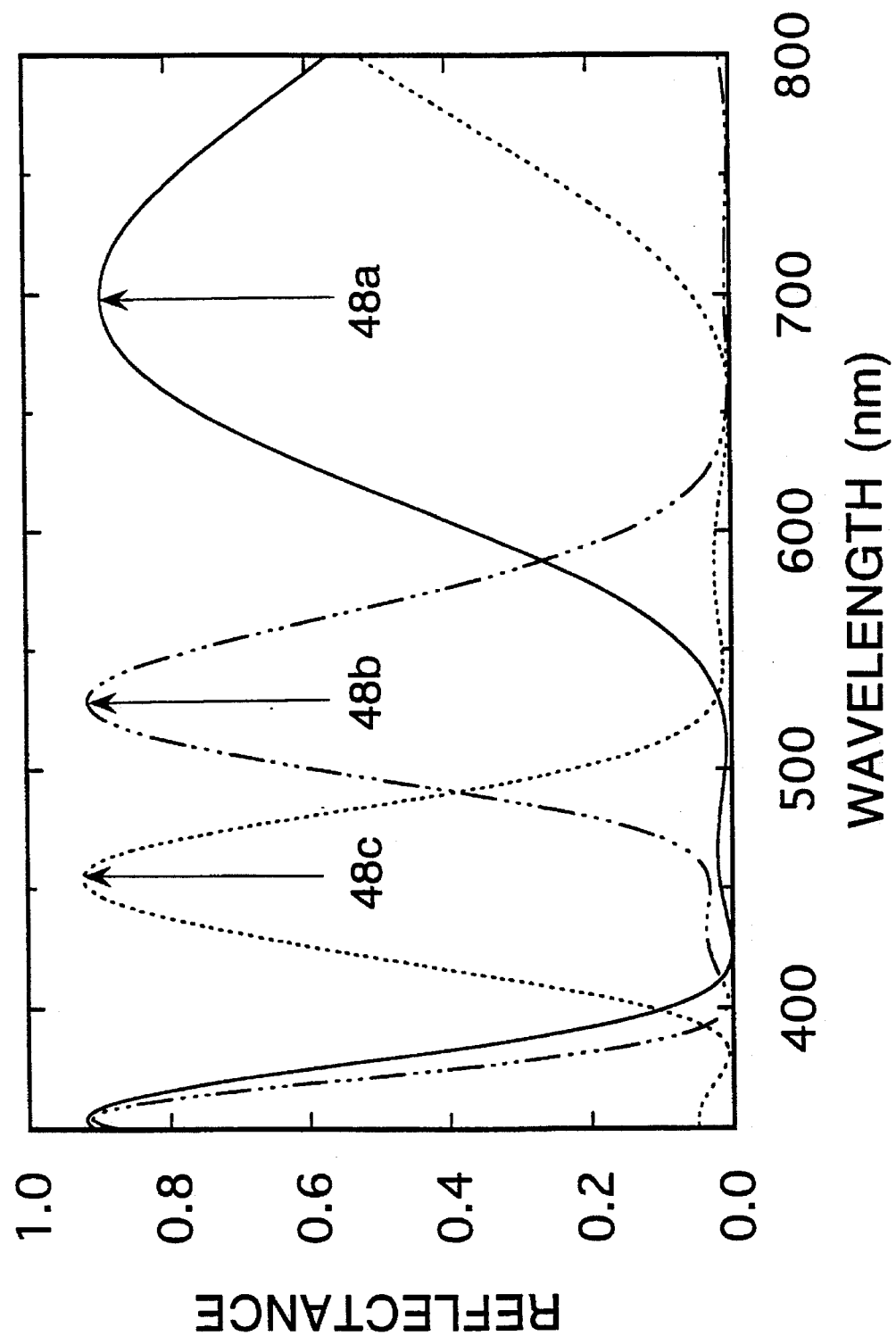
FIG. 3 shows the calculated reflectance curves of red, green and blue optical thin film interference colour coatings of a first embodiment of the present invention.
Figure 4:
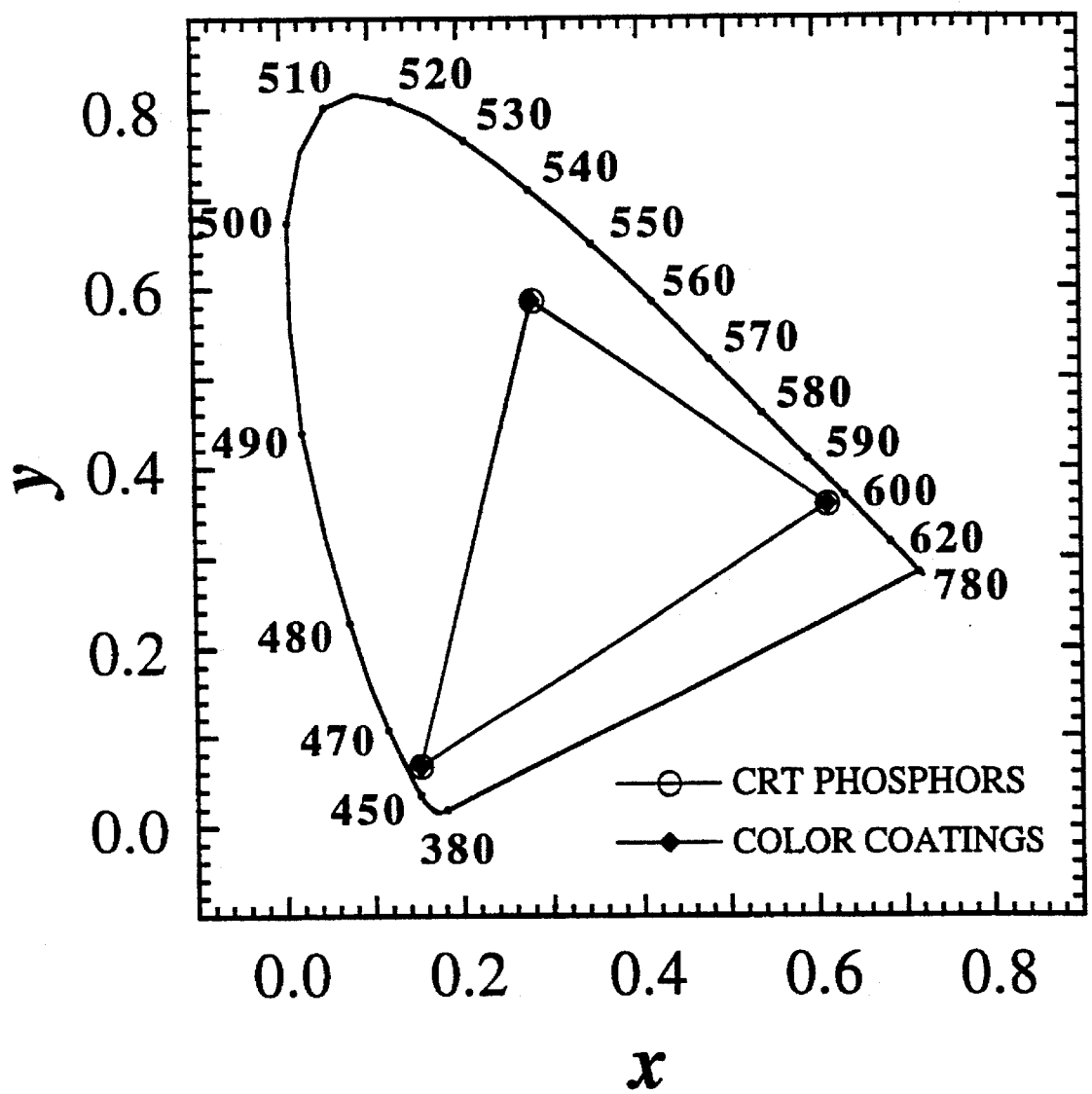
FIG. 4 shows CIE coordinates of the red, green and blue optical thin film interference colour coatings in FIG. 3 and those of standard CRT red, green and blue phosphors on a CIE chromaticity diagram.

FIG. 3 shows the calculated reflectance curves of the red 48a, green 48b and blue 48c optical thin film interference colour coatings of the first embodiment of the present invention. All three optical thin film interference colour coatings were designed to have the same number of layers and to be made of the same materials, $SiO_2$ and Inconel™, but with different layer thicknesses. Although it is desirable to have as few layers and materials as possible for all the three optical thin film interference colour coatings, this is not always necessary. The mirror substrate is made of aluminum that has a high reflectance; therefore the optional high reflectance layer is not required as the mirror substrate also acts as the first optical layer for the optical thin film interference colour coating. The layer parameters and calculated CIE coordinates (x,y) and the luminance (L) of these three primary optical thin film interference colour coatings are listed in Table I. The CIE colour coordinates of the above optical thin film interference colour coatings and the current CRT red, green and blue phosphors are also plotted on a CIE 2° chromaticity diagram in FIG. 4. It is obvious from FIG. 4 that the CIE coordinates of the three optical thin film interference colour coatings of the first embodiment of the present invention (dark diamonds), match very well with those of the current CRT red, green and blue phosphors (circles). The red, green and blue CIE coordinates define a triangle inside of which all colours can be represented by a suitable combination of these three primary colours.

Figure 5:
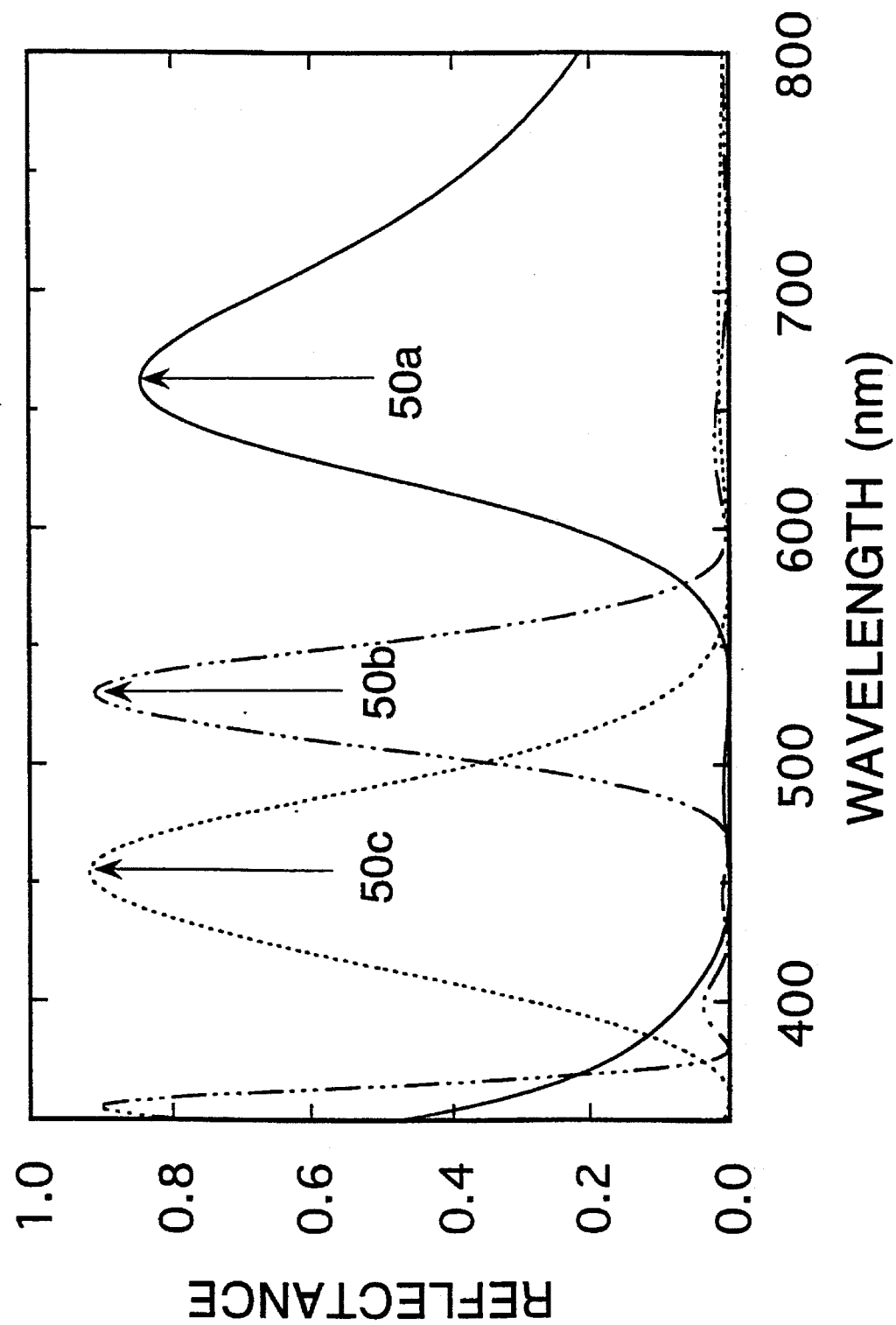
FIG. 5 shows calculated reflectance curves of red, green and blue optical thin film interference colour coatings of a second embodiment of the present invention.
Figure 6:
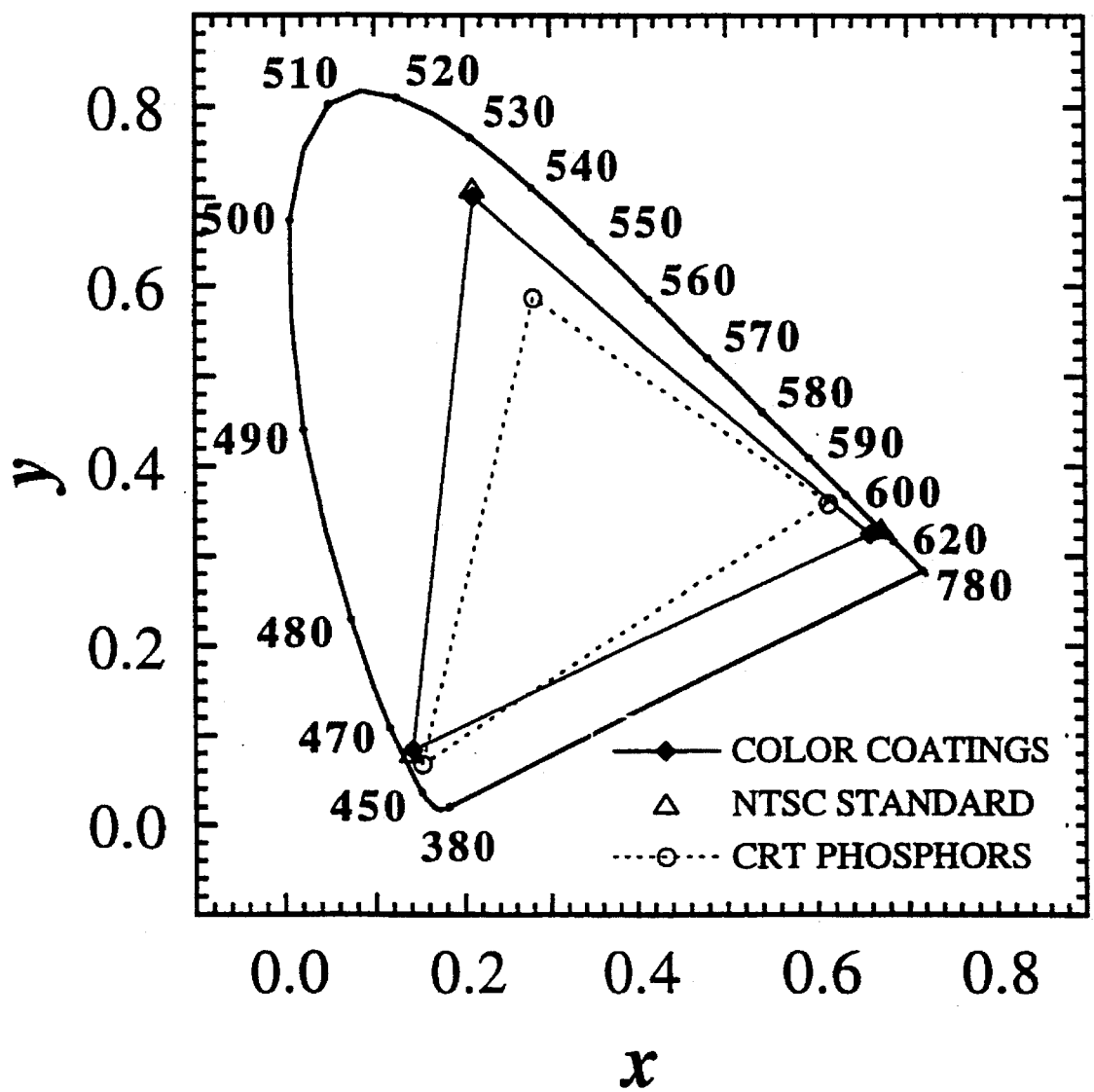
FIG. 6 shows CIE coordinates of the red, green and blue optical thin film interference colour coatings in FIG. 5 and those of CRT phosphors and NTSC specifications on a CIE chromaticity diagram; and, FIG. 7A–7E show cross-sectional views illustrative of the manufacturing steps of a colour deformable mirror device having optical thin film interference colour coatings in accordance with the present invention.

From the book, *"Color Science: concepts and methods, quantitative data and formulae"* by G. Wyszecki et at., 2nd ed., published by Wiley in Toronto, 1982, it is known that, once a light source is chosen, for each given set of CIE coordinates (x,y) there exists an optimum colour filter having a maximum luminance (L). The closer the CIE coordinates of the colour filter are to the boundary of the CIE chromaticity diagram, the purer the colour of the reflected or transmitted light. However, the colour filter also has a lower luminance. Therefore, there is a trade-off between the colour purity and the luminance of the display. In North America, the current television signals broadcast in the NTSC specifications. However, if the television signals are directly applied to a monitor with the current CRT phosphors it will result in colour errors because these CRT phosphors do not match the NTSC specifications. One way to solve this problem is to incorporate circuitry in a receiver to convert the NTSC signals to the signals appropriate to the used phosphors. However, this will still not fully resolve the problem since some colours can not reproduced by the current CRT phosphors. Therefore, it is desirable to design a colour DMD in accordance with the present invention to match the NTSC specifications. The second embodiment of the present invention is designed for this purpose. FIG. 5 shows the calculated reflectance curves of the red 50a, green 50b and blue 50c optical thin film interference colour coatings of the second embodiment. They consist of five layers of $SiO_2$ and Inconel™ on an aluminum substrate. The layer materials and thicknesses of the coatings and the calculated CIE coordinates are listed in Table II. The CIE coordinates of the optical thin film interference colour coatings (diamonds), the current CRT phosphors (circles) and the NTSC standard colour specifications (triangles) are also plotted on the 2° CIE chromaticity diagram in FIG. 6. From FIG. 6, it is clear that the second embodiment matches well with the NTSC standards and can represent more colours than the current CRT phosphors. Therefore, better colour performance can be achieved in a projection system employing such a colour DMD. This also demonstrates the flexibility of optical thin film interference colour coatings.

A preferred method of fabricating a colour DMD having optical thin film interference colour coating(s), in accordance with the present invention, will be explained in detail with the aid of FIGS. 7A–7E showing the cross-sectional views of the various steps of the fabrication process. The drawings are schematic and are for the purpose of illustration only. The horizontal and vertical dimensions are not to scale. To better understand the preferred fabrication method in accordance with the present invention, knowledge of the manufacturing process of the present-day conventional DMDs is required and the reader is referred to "Spatial Light Modulator and Method," U. S. Pat. No. 5,172,262, Larry. J. Hornbeck et at., issued on Dec. 15, 1992.

Figure 7A:
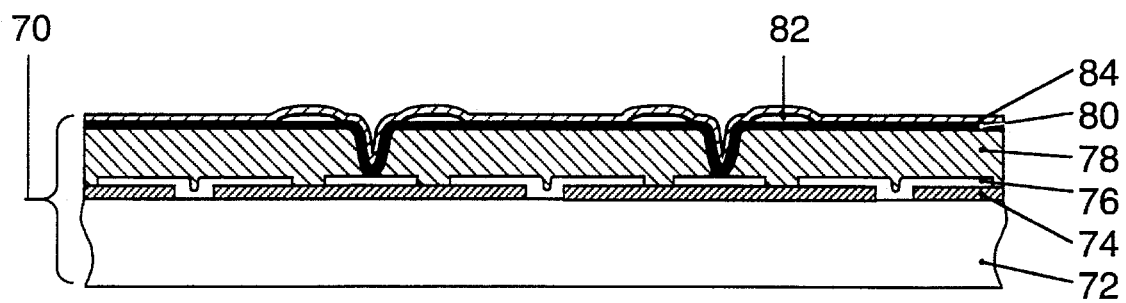
Figure 7B:
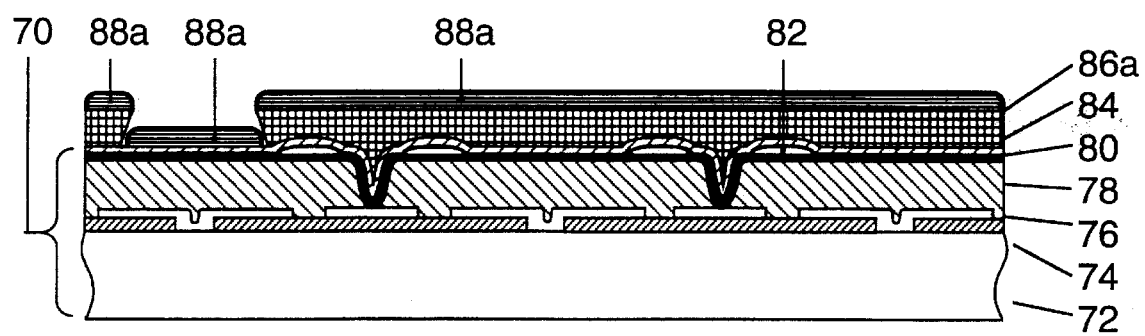
Figure 7C:
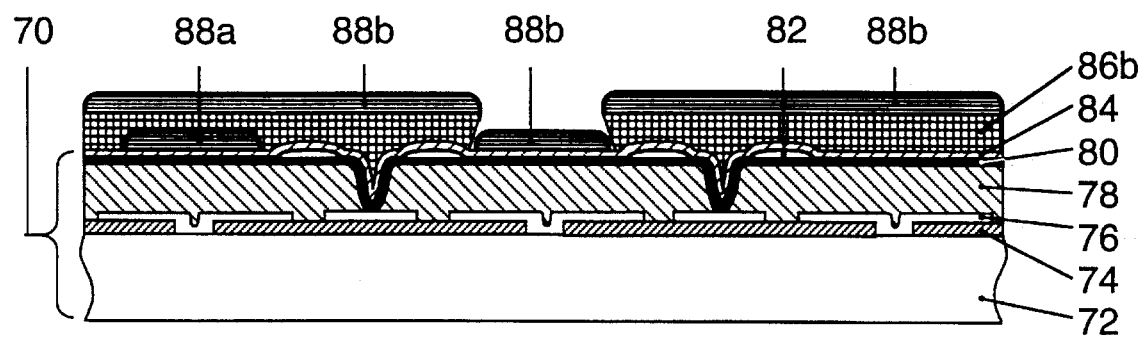
Figure 7D:
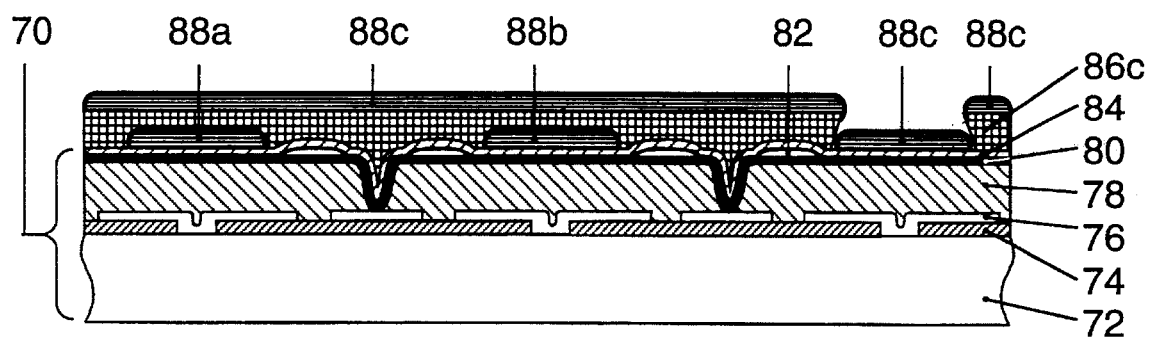
Figure 7E:
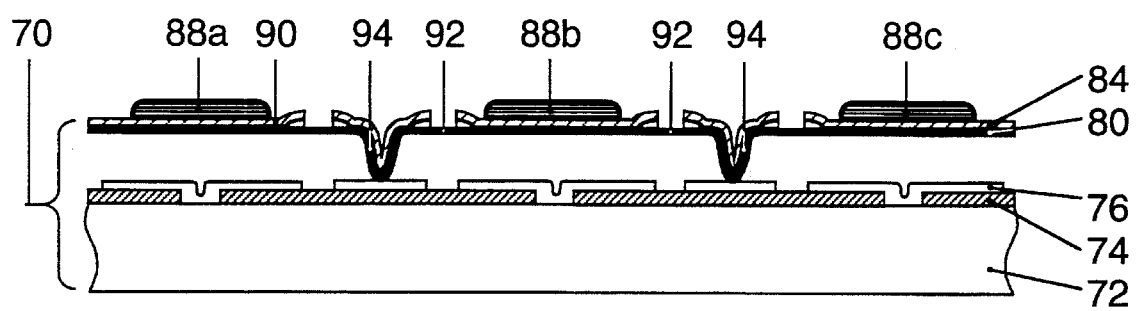

First, the basic structure 70 of the colour DMD in accordance with the present invention is fabricated by a conventional process similar to that used in the present-day monochromatic DMDs. In FIG. 7A, the basic structure 70 includes driving electronics on a semiconductor substrate 72, a dielectric insulator layer 74, connecting electrodes 76, a patterned thick spacer layer 78, a continuous hinge metal layer 80, a patterned hinge dielectric layer 82, and a continuous beam metal layer 84. At this stage, the optical thin film interference colour coating(s) in accordance with the present invention is introduced. A lift-off process is used for the deposition of the first optical thin film interference colour coating. First, a photo-resist layer 86a is spun on the surface of the basic structure 70 and then is patterned in a pre-defined way to provide openings for the optical thin film interference colour coating 88a as shown in FIG. 7B. A negative slope or profile of the photo-resist layer 86a is generated in order to produce a better lift-off result for the subsequent layers of the optical thin film interference colour coating 88a. A single layer, or, if necessary, a multilayer-layer photo-resist structure may be used. For example, a three layer structure having a photo-resist layer, an anti-reflection coating and a PMMA layer, normally result in a better lift-off than a single layer photo-resist. The individual layers in the optical thin film interference colour coating 88a, such as described in Table I and II, are deposited by either physical vapor deposition (PVD) or chemical vapor (CVD) deposition processes. The deposition processes include evaporation, sputtering, ion plating, plasma enhanced CVD, etc. The photo-resist layer 86a is then lifted off or removed and the coating in the open area forms the optical thin film interference colour coating 88a. If necessary, similar processes may be repeated to form a second optical thin film interference colour coating 88b as shown in FIG. 7C, a third optical thin film interference colour coating 88c (FIG. 7D), etc. The second 88b and third 88c optical thin film interference colour coatings can have layer materials and thicknesses as described in Table I and II. At this stage, a conventional process for the manufacture of a monochromatic DMD is applied to remove the hinge and beam metals in the unwanted areas in order to form each individual colour mirrors. Finally, the underlying spacer layer 78 is removed by a etching process. The complete finished colour deformable mirror device in accordance with the present invention is shown in the cross-sectional view of FIG. 7E. The colour deformable mirror has three arrays of optical thin film interference colour coatings 88a, 88b, and 88c, where each optical thin film interference colour coating is deposited on a mirror substrate 90 and is supported by two hinges 92 and two posts 94.

It is clear that, without departing from the spirit of the present invention, that other photo-lithographic patterning processes can be used to form the optical thin film interference colour coatings as well. For example, instead of using a lift-off process to deposit the optical thin film interference colour coatings, an etching processes can be used to pattern the optical thin film interference colour coatings.

A significant advantage of the colour deformable mirror device in accordance with the present invention is that the manufacturing process is completely compatible with the processes used for the construction of a conventional DMD. There are only a few extra photo-lithographic patterning processes and deposition processes required to form the optical thin film interference colour coatings. This can be done easily using the existing equipment for conventional DMDs and no extra equipment is needed.

The colour deformable mirror devices having optical thin film interference colour coatings, in accordance with the present invention, consisting of preferred materials and being fabricated by the preferred manufacturing methods, are very stable both chemically and mechanically. Good colour performance can be achieved by choosing the right thickness and material for each layer in the optical thin film interference colour coatings. The colour deformable device has a good thermal conductivity as well as low absorption in the infrared region. The optical thin film interference colour coatings have very good adhesion to the aluminum mirror substrate. The coatings are of good quality with very few film defects. Therefore, the performance of the optical thin film interference colour coatings of the present invention is much better than that of dyes or dye-resist mixtures, that tend to deteriorate with time and with exposure to light and heat. In addition, the optical thin film interference colour coatings can also act as protecting coatings for aluminum mirror substrates that usually deteriorate in the ambient atmosphere. A display system employing the colour deformable mirror device in accordance with the present invention can obtain full colours without the use of expensive and bulky beam splitting and combining optical components, and, therefore, is much compact in size and can be used in a harsh environment.

References

1. W. E. Nelson, "Color Deformable Mirror Device and Method for Manufacture," U.S. Pat. No. 5,168,406, issued on Dec. 1, 1992.
2. M. A. Mignardi et al., "Method for Manufacturing a Color Filter for Deformable Mirror Device," U.S. Pat. No. 5,240,818, issued on Aug. 31, 1993.
3. L. J. Hornbeck, "Spatial Light Modulator and Method," U.S. Pat. No. 4,662,746, issued on May 5, 1987,
4. J. Hornbeck et al., "Spatial Light Modulator and Method," U.S. Pat. No. 5,172,262, issued on Dec. 15, 1992
5. G. Wyszecki et al., *"Color Science: concepts and methods, quantitative data and formulae,"* 2nd ed., Toronto, Wiley, 1982.
6. *Television Engineering Handbook*, edited by K. B. Benson, McGraw-Hill, New York, 1992.

TABLE I

| | | Layer parameters and CIE coordinates of the first embodiments | | | | | |
|---|---|---|---|---|---|---|---|
| | | Red | | Green | | Blue | |
| Color Coating | | Material | Thickness (nm) | Material | Thickness (nm) | Material | Thickness (nm) |
| Layer Structure | Substrate | Al | ≧30 | Al | ≧30 | Al | ≧30 |
| | 1 | SiO$_2$ | 224.7 | SiO$_2$ | 345.9 | SiO$_2$ | 295.6 |
| | 2 | Inconel ™ | 8.5 | Inconel ™ | 9.1 | Inconel ™ | 7.8 |
| | 3 | SiO$_2$ | 238.6 | SiO$_2$ | 372.6 | SiO$_2$ | 299.5 |

TABLE I-continued

Layer parameters and CIE coordinates of the first embodiments

| Color Coating | | Red | | Green | | Blue | |
|---|---|---|---|---|---|---|---|
| | | Material | Thickness (nm) | Material | Thickness (nm) | Material | Thickness (nm) |
| | Medium | Air | | Air | | Air | |
| CIE Coordinates | Color Coating | x = 0.612<br>y = 0.358<br>L = 0.187 | | x = 0.280<br>y = 0.587<br>L = 0.493 | | x = 0.152<br>y = 0.068<br>L = 0.066 | |
| | CRT Phosphor | x = 0.618<br>y = 0.350 | | x = 0.280<br>y = 0.588 | | x = 0.152<br>y = 0.064 | |

TABLE II

Layer parameters and CIE coordinates of the second embodiments

| Color Coating | | Red | | Green | | Blue | |
|---|---|---|---|---|---|---|---|
| | | Material | Thickness (nm) | Material | Thickness (nm) | Material | Thickness (nm) |
| Layer Structure | Substrate | Al | ≧30 | Al | ≧30 | Al | ≧30 |
| | 1 | SiO$_2$ | 200.5 | SiO$_2$ | 348.1 | SiO$_2$ | 137.6 |
| | 2 | Inconel ™ | 13.5 | Inconel ™ | 10.3 | Inconel ™ | 9.7 |
| | 3 | SiO$_2$ | 232.6 | SiO$_2$ | 354.5 | SiO$_2$ | 150.5 |
| | 4 | Inconel ™ | 6.0 | Inconel ™ | 4.4 | Inconel ™ | 3.8 |
| | 5 | SiO$_2$ | 238.5 | SiO$_2$ | 362.7 | SiO$_2$ | 143.3 |
| | Medium | Air | | Air | | Air | |
| CIE Coordinates | Color Coating | x = 0.659<br>y = 0.324<br>L = 0.123 | | x = 0.211<br>y = 0.700<br>L = 0.320 | | x = 0.142<br>y = 0.084<br>L = 0.087 | |
| | NTSC Standard | x = 0.670<br>y = 0.330 | | x = 0.210<br>y = 0.710 | | x = 0.140<br>y = 0.080 | |

What we claim is:

1. A semiconductor device comprising:

circuitry for accepting electronic signals;

a plurality of deformable mirrors selectably operable to reflect incident light, responsive to the electronic signals; and a first group of said plurality of deformable mirrors being coated with an optical thin film interference colour coating having at least a layer that is substantially transparent with respect to the incident light, the optical thin film interference colour coating including at least one further layer that is partially absorbing with respect to the incident light, so that the spectral reflectance and absorptance of the deformable mirror is modified to produce a desired reflected colour by the process of optical interference enhanced absorption in the optical interference colour coating, the layers being of predetermined thicknesses and materials, wherein the thickness of the substantially transparent layer substantially determines the desired reflected colour.

2. A semiconductor device as defined in claim 1, wherein the deformable mirrors have a coating with a high reflectance.

3. A semiconductor device as defined in claim 1, wherein the substantially transparent layer in the optical thin film interference colour coating is between the partially absorbing layer and a reflecting surface of the deformable mirrors.

4. A semiconductor device as defined in claim 2, wherein the substantially transparent layer is between the partially absorbing layer and the coating having a high reflectance.

5. A semiconductor device as defined in claim 4, wherein the substantially transparent layer is comprised of SiO$_2$ or Al$_2$O$_3$.

6. A semiconductor device as defined in claim 4, wherein the partially absorbing layer is comprised of an alloy of nickel.

7. A semiconductor device as defined in claim 4 wherein the coating having a high reflectance is comprised of aluminum.

8. A semiconductor device as defined in claim 1 wherein the optical thin film interference colour coating includes a plurality of substantially transparent and partially absorbing alternating layers.

9. A semiconductor device as defined in claim 1, further comprising a second group of said plurality of deformable mirrors being coated with a second optical thin film interference colour coating having at least a layer that is substantially transparent with respect to the incident light, the optical thin film interference colour coating including at least one further layer that is partially absorbing with respect to the incident light, so that the spectral reflectance and absorptance of the deformable mirror is modified to produce a second desired reflected colour by the process of optical interference enhanced absorption in the optical interference colour coating, the layers being of predetermined thicknesses and materials, wherein the thickness of the substantially transparent layer substantially determines the second desired reflected colour.

10. A semiconductor device as defined in claim 9, further comprising a third group of said plurality of deformable mirrors being coated with a third optical thin film interference colour coating having at least a layer that is substantially transparent with respect to the incident light, the optical thin film interference colour coating including at least one further layer that is partially absorbing with respect to the incident light, so that the spectral reflectance and absorptance of the deformable mirror is modified to produce a third desired reflected colour by the process of optical interference enhanced absorption in the optical interference colour coating, the layers being of predetermined thicknesses and materials, wherein the thickness of the substantially transparent layer substantially determines the third desired reflected colour.

11. The semiconductor device as defined in claim 10, wherein the first, second and third groups of mirrors form three-colour pixels.

12. A semiconductor device as defined in claim 1 wherein the plurality of deformable mirrors are made of a conducting metal, metal alloy, or semiconductor selected from the group consisting of Al, Cr, Co, Cu, Au, Hf, Mo, Ni, Nb, Pt, Ag, Ta, Ti, W, Yr, Zr, Si, Ge, and their alloys.

13. A semiconductor device as defined in claim 2, wherein the plurality of deformable mirrors have a coating with a high reflectance, the coating being a layer of a metal, metal alloy or semiconductor selected from the group consisting of Al, Cr, Co, Cu, Au, Hf, Mo, Ni, Nb, Pt, Ag, Ta, Ti, W, Yr, Zr, Si, Ge, and their alloys.

14. A semiconductor device as defined in claim 1 wherein the substantially transparent layer is comprised of a dielectric material selected from the group consisting of oxides, nitrides, fluorides, selenides and sulfides.

15. The semiconductor device as defined in claim 14, wherein the dielectric material is selected from the group consisting of $SiO_2$, $Al_2O_3$, $HfO_2$, $Nb_2O_5$, $Ta_2O_5$, $TiO_2$, $Y_2O_3$, $ZrO_2$, SiN, AlN, $MgF_2$, $CaF_2$, ZnSe, and ZnS.

16. The semiconductor device as defined in claim 1, wherein the at least partially absorbing layer is made of a material selected from the group consisting of metals, metal alloys, and semiconductors.

17. The semiconductor device as defined in claim 16, wherein the at least partially absorbing layer is made of a material selected from the group consisting of Al, Fe, Cr, Co, Cu, Au, Hf, Mo, Ni, Nb, Pt, Ag, Ta, Te, Ti, W, Yr, Zr,, Si, Ge and their alloys.

18. The semiconductor device as defined in claim 1, wherein the all the deformable mirrors have only one optical thin film interference colour coating.

* * * * *